United States Patent Office 3,395,106
Patented July 30, 1968

3,395,106
PAPER-COATING COMPOSITION CONTAIN-
ING MODIFIED DIALDEHYDE POLYSAC-
CHARIDE-MODIFIED POLYSACCHARIDE-
REACTION PRODUCT
James Huey Curtis, Elkhart, Ind., assignor to Miles
Laboratories, Inc., Elkhart, Ind., a corporation of
Indiana
No Drawing. Filed Sept. 27, 1965, Ser. No. 490,692
11 Claims. (Cl. 260—8)

ABSTRACT OF THE DISCLOSURE

An improved paper coating composition wherein the binder comprises a combination of (A) about 0–90 weight percent protein and (B) about 10–100 weight percent of a modified dialdehyde polysaccharide-modified polysaccharide reaction product, said weight percent being based on the total combined weight of the protein and the modified reaction product.

---

This invention relates to compositions useful for coating paper. More particularly, it relates to improved binders for inclusion in compositions useful for coating paper to be employed in offset printing processes. Coated paper to be used in offset printing must have a coating which is highly resistant to wet-rub abrasion since the offset printing process exposes the coated paper to high humidity conditions. Such humidity conditions tend to soften the coating and can cause loss of portions of the coating if it is not strongly bonded to the paper substrate.

Cellulosic papers coated with clay are commonly employed in the printing industry. The clay coating composition employs binders, such as starch or protein, to bind the clay particles to each other and to the paper substrate. It is also known that starch-protein mixtures are deemed to be unsuitable as binders since the starch and protein are considered to be incompatible. The clay-binder mixture must be properly insolubilized in order to form the desired binding action. Formaldehyde is an insolubilizing agent which is commonly used in the art. The use of formaldehyde, however, has attendant disadvantages. It presents a health hazard since its toxic vapors irritate the eyes and mucous membranes. It is also volatile and a large excess is generally required in order to achieve desired insolubilization conditions.

It is therefore an object of the persent invention to eliminate the use of formaldehyde as an insolubilizing agent for paper coating compositions.

It is also an object of the present invention to replace at least some, if not all, of the expensive protein binder in the coating compositions with a less expensive binder and still retain the desired overall coating characteristics.

It is additionally an object of the present invention to produce a compatible starch-protein mixture suitable as a binder for clay coatings.

In accordance with the present invention, an improved paper coating composition is provided wherein the binder comprises a combination of (A) about 0–90 weight percent protein and (B) about 10–100 weight percent of a modified dialdehyde polysaccharide-modified polysaccharide reaction product, said weight percents being based on the total combined weight of the protein and the modified reaction product. The modified reaction product (B) employed in this composition is the product of reaction of about 9–20 weight percent of a modified dialdehyde polysaccharide and about 80–91 weight percent of a modified polysaccharide, said weight percents being based on the total weight of the modified reaction product. The modified dialdehyde polysaccharide employed in this reaction product is selected from the class consisting of (1) the reaction product of about 70–85 parts by weight dialdehyde polysaccharide and about 15–30 parts by weight of a condensation product of dicyandiamide and formaldehyde and (2) the reaction product of about 70–85 parts by weight dialdehyde polysaccharide, about 7.5–15 parts by weight carboxylated polysaccharide and about 7.5–15 parts by weight of a condensation product of dicyandiamide and formaldehyde. The modified polysaccharide employed in this reaction product is selected from the class consisting of hydroxyethylated polysaccharides, carboxylated polysaccharides, acetylated polysaccharides and enzyme converted polysaccharides.

Preferably, the above-described binder contains about 60–90 weight percent protein (A) and about 10–40 weight percent reaction product (B) based on the total combined weight of protein (A) and reaction product (B). The binder preferably contains as the modified dialdehyde polysaccharide component of reaction product (B) the reaction product of about 70–85 parts by weight dialdehyde polysaccharide and about 15–30 parts by weight of a condensation product of dicyandiamide and formaldehyde. The binder also preferably contains hydroxyethylated polysaccharide as the modified polysaccharide component of reaction product (B). The binder most preferably contains a reaction product (B) consisting of about 20 weight percent of the reaction product of about 70 parts by weight dialdehyde polysaccharide and about 30 parts by weight of a condenesation product of dicyandiamide and formaldehyde and about 80 weight percent hydroxyethylated polysaccharide.

The binder of the present invention can also contain other well-known constituents, such as a butadiene-styrene latex. Such latex, calculated as the dry weight of the solid matter suspended in an aqeuous medium, is conveniently employed in an amount of about 10 to 50 weight percent based on the total weight of the binder.

The dialdehyde polysaccharide useful as starting materials in the present invention are well known in the art. Such materials are frequently referred to as periodate oxidized polysaccharides because of their preparation by the well known oxidation of polysaccharides with periodic acid. This preparation can be illustrated by the conversion of a polysaccharide, such as starch, to dialdehyde starch or periodate oxidized starch using periodic acid in accordance with the following equation:

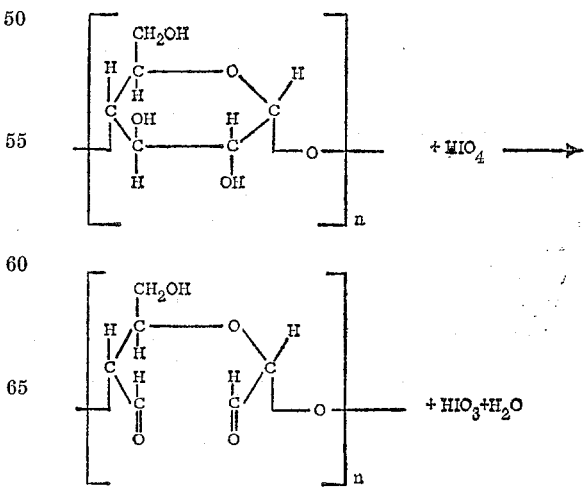

wherein $n$ stands for the number of repeating structural units in the molecule, which may range from as few as about 20 to as many as several thousand. The preparation of dialdehyde starch is more particularly described in U.S. Patents No. 2,648,629 of W. Dvonch et al. and No. 2,713,553 by C. L. Mehltretter.

The dialdehyde polysaccharides to be used in preparing the novel binder compositions of the present invention may be the dialdehyde derivatives of any polysaccharides, such as corn, wheat, rice, tapioca or potato starches, amylopectins, celluloses, gums, dextrans, algins, inulins and the like. Of these polysaccharides, the dialdehyde derivatives of starch, known generically as dialdehyde starch, are the best known and most widely used. However, where it is desired to have dialdehydes of other polysaccharides, these may be used as well. The dialdehyde polysaccharides useful in the present invention can contain from about 0.5 to about 100 mole percent dialdehyde polysaccharide units. In general, it is preferred to use dialdehyde polysaccharides which are about 90 to 100 percent oxidized; i.e., those wherein about 90 to 100 out of each 100 of the original anhydroglucose units have been converted to dialdehyde units such as by periodate oxidation as above described.

The modified dialdehyde polysaccharides used in preparing the novel binder compositions of the present invention may be either (1) the reaction product of about 70–85 parts by weight dialdehyde polysaccharide and about 15–30 parts by weight of a condensation product of dicyandiamide and formaldehyde or (2) the reaction product of about 70–85 parts by weight dialdehyde polysaccharide, about 7.5–15 parts by weight carboxylated oxidized polysaccharide and about 7.5–15 parts by weight of a condensation product of dicyandiamide and formaldehyde. The dialdehyde polysaccharides used in preparing these modified dialdehyde polysaccharides are described above.

The condensation products of dicyandiamide and formaldehyde useful in preparing the above modified dialdehyde polysaccharides are well-known in the art. Generally such condensation products are prepared by mixing dicyandiamide, formaldehyde and catalyst, such as ammonium chloride, and allowing the exothermic reaction to heat the mixture to about 65–100° C. The dicyandiamide-formaldehyde condensation product preferably employed in the present invention is prepared by forming an aqueous slurry of 1.5–2.0 moles of formaldehyde and 1 mole of dicyandiamide, adding stepwise to the slurry 0.3 to 0.6 mole of a catalyst, such as ammonium chloride, in amounts to maintain the temperature of the reaction mixture below about 70° C. and to maintain the pH of the reaction mixture initially between about 1.0 and about 2.5 and upon completion of the reaction between about 2.5 and about 3.5, carrying out the reaction at a temperature below about 70° C. and pH below about 3.5 until a water-soluble reaction product having an average molecular weight of about 500 to about 700 is obtained, and then cooling the reaction product to room temperature. Upon standing at room temperature the pH of the reaction mixture will gradually increase within about 2 hours to about 3.8–4.2.

Modified dialdehyde polysaccharides represented by reaction product (1) above are prepared by mixing about 70–85 parts by weight, preferably about 70 parts by weight, dialdehyde polysaccharides with about 15–30 parts by weight, preferably about 30 parts by weight, of a condensation product of dicyandiamide and formaldehyde in about 300–500 parts by weight water to form a slurry containing about 20–30 weight percent solids, heating the slurry with stirring to about 70–100° C., maintaining the slurry at about 70–100° C. with stirring for about 10–15 minutes until the dispersion of the solid material is complete, cooling the dispersion to about 70° C., adjusting the pH of the dispersion to about 4–5.5 and then drying the dispersion, preferably by spray drying, and collecting the finely-divided dried solidified product. This powdered product is conveniently employed in the formation of the novel binder compositions.

Modified dialdehyde polysaccharides represented by reaction product (2) above are prepared by mixing about 70–85 parts by weight, preferably about 70 parts by weight, dialdehyde polysaccharides, about 7.5–15 parts by weight, preferably about 15 parts by weight, carboxylated polysaccharides and about 7.5–15 parts by weight, preferably about 15 parts by weight, of a condensation product of dicyandiamide and formaldehyde to form a slurry containing about 15–25 weight percent solids, heating the slurry with stirring to about 90–100° C., maintaining the slurry at about 90–100° C. with stirring for about 5–15 minutes until the dispersion of the solid material is complete, cooling the dispersion to about 70° C., adjusting the pH of the dispersion to about 4–5.5 and drying the dispersion, preferably by spray-drying, and collecting the finely-divided dried solidified product. This powdered product is conveniently employed in the formation of the novel binder compositions.

The carboxylated polysaccharides, such as hypochlorite oxidized starches, to be used in preparing the above described novel binder compositions are well-known in the art. They are generally prepared by reacting a mild oxidizing agent, such as an alkaline hypochlorite salt or hydrogen peroxide, with a polysaccharide of the type described above to oxidize the —$CH_2OH$ groups on the anhydroglucose monomer units to —COOH groups. It is also well-known that in the commercially available carboxylated polysaccharides, such as the hypochlorite oxidized starches, such oxidation takes place on only about 1 to about 10 out of 100 of the original anhydroglucose units in the polysaccharide.

The modified polysaccharides useful in preparing the above-described novel binder compositions are represented by carboxylated polysaccharides, hydroxyethylated polysaccharides, acetylated polysaccharides and enzyme converted polysaccharides. The carboxylated polysaccharides are described above.

The hydroxyethylated polysaccharides, such as hydroxyethylated starches, are also well-known in the art. They are generally prepared by reacting ethylene oxide with a polysaccharide of the type described above in an alkaline medium to form ether linkages with the —$CH_2OH$ group and thus results in —$CH_2OCH_2CH_2OH$ groups attached to some of the anhydroglucose monomer units. It is also known that such hydroxyethylation takes place on only from about 1 to about 10 out of 100 of the original anhydroglucose units in the polysaccharide.

The acetylated polysaccharides, such as acetyl esters of starch, to be used in the present invention are well-known in the art. They are generally prepared by reacting acetic anhydride with a polysaccharide of the type described above to form ester linkages with some of the hydroxyl groups of the anhydroglucose units. It is known that such ester formation takes place in from about 1 to about 10 out of 100 of the original anhydroglucose units in the polysaccharide.

The enzyme converted polysaccharides, such as enzyme converted starches, are also well-known in the art. They are generally prepared by treating a polysaccharide of the type described above with an alpha-amylase so as to break up the long chain polysaccharide into shorter chain segments having an overall reduced viscosity. It is generally known that an enzyme converted starch that might have utility in paper coating compositions should have a viscosity less than about 300 centipoises and preferably from about 50 to about 150 centipoises.

Reaction product (B) employed in the formation of the novel binder compositions is preferably prepared by mixing about 9–20 weight percent of a modified dialdehyde polysaccharide described above and about 80–90 weight percent of a modified polysaccharide described above in an aqueous medium to form a slurry having about 15 weight percent solids, and then reacting the non-aqueous components of this slurry with each other by heating to 188–192° F. (87–89° C.) for about 15 minutes or until complete solution or dispersion is attained. This preferred procedure enables a desirably low viscosity product to be obtained. The reaction between these reaction product constituents can take place, however, at room temperature, if desired.

The protein (A) component of the novel binder composition is preferably casein, but other proteins, such as soy bean protein, alpha protein, delta protein and the like, can also be used. The protein, such as casein, is preferably dissolved in water by heating it in an alkaline medium.

The novel binder of the present invention can be used with any of the well-known pigments and coating color ingredients known to the paper coating art. A generally used and convenient pigment is clay and it is used in the form of an aqueous slip containing about 70 weight percent solids.

The overall coating composition is conveniently prepared by adding the protein (A), preferably in the form of an aqueous solution, to the pigment slip followed by the reaction product (B). The pH of the slurry is adjusted to a value of 5.5–9.0 and then the remaining binder constituents, such as the butadiene-styrene latex, are added. This coating composition can then be applied to various types of cellulosic webs or papers in any convenient manner to provide a substantially uniform coating on the paper. Application can be, for example, by size press, air knife, blade coaters, roll coaters or rod coaters. Application can be made on-machine or off-machine as desired. Following application of the coating composition, prepared as above-described, in any desired coat weight, the coated cellulosic web is dried and stored for later use.

The thus prepared coated cellulosic material is characterized as having desired wet rub resistance, wax pick properties, brightness, opacity, and gloss. The improved coating has the advantage that it is characterized by all of the properties desired in a superior paper coating composition as well as by the absence of formaldehyde as an insolubilizing agent and by a substantially reduced protein content. Moreover, the improved coating is further characterized by substantial novelty in that it embodies therein a surprisingly compatible starch-protein binder.

The invention will be described in further detail in the following examples.

EXAMPLE 1

A dry blend of 80 parts by weight hydroxyethylated corn starch (Clineo 718D) and 20 parts by weight of a reaction product of 70 parts by weight dialdehyde corn starch being about 90 percent oxidized and 30 parts by weight of a condensation product if dicyandiamide and formaldehyde prepared by the preferred procedure referred to above was added to water to form a slurry having 15 weight percent solids. This slurry was heated with stirring to 188–192° F. (87–89° C.) for 15 minutes to react the non-aqueous constituents of the slurry with each other to form a modified dialdehyde polysaccharide-modified polysaccharide reaction product. A protein solution was prepared by mixing casein with water in a 15 weight percent concentration, adding 12.8 weight percent ammonium hydroxide and heating at 135–140° F. (57–60° C.) for 30 minutes. A pigment slip was obtained by mixing Georgia kaolin clay (Premier SD) and water to form a slurry having 70 weight percent solids. A latex constituent of the binder portion of the coating composition was obtained by using a commercially available aqueous butadiene-styrene latex (Dow 630) having a 48 weight percent solids content. Coating compositions were prepared by mixing the protein solution with the pigment slip, adding the modified dialdehyde polysaccharide-modified polysaccharide reaction product, adjusting the pH to 8.5 if necessary and finally adding the latex. The overall aqueous coating composition contained about 52 weight percent solids. This represents typical paper coating practice, especially for coated papers to be used for offset printing.

Various coating compositions were prepared wherein the protein and modified dialdehyde polysaccharide-modified polysaccharide components of the coating binder were varied over an extended range. A control coating composition was also prepared wherein a 37 weight percent aqueous solution of formaldehyde was used as the insolubilizing agent. This represents the state of the prior art. The clay pigment content of the overall coating composition was kept constant at about 86 weight percent based on total dry weight of the coating composition while the latex content of the binder was kept constant at 37.5 weight percent based on total weight of binder. The resulting coating compositions were applied in a coating weight of about 7–8 lbs. per 3000 sq. ft. of paper by means of a Meyer draw down rod. A commercially available paper coating base stock was used as the paper substrate. The coated paper was air dried at room temperature (20–30° C.) for about 15 minutes and then cured by heating at 220° F. (104° C.) for 3 minutes. The paper was then calendered.

Test samples of the coated paper were then evaluated for wet rub resistance and wax pick characteristics. The wet rub test consisted of placing a 1 cc. portion of water on the paper sample, waiting 15 seconds and then making twenty double strokes with an index finger against the wet paper surface using moderate pressure. The paper surface is then examined for the presence of abraded particles. The wax pick test is described in TAPPI standard T 459 m–48 and is a measure of the resistance of a coating to adhere to an adhesive wax which is applied to the coating surface and then pulled off. This is a test of coating strength. The wax pick number is the highest grade number on a scale from 2 to 20 of an adhesive wax which does not disturb the surface of the coated paper.

The following table shows the coating composition formulations that were used, the viscosity of the coating formulations prior to application to paper, and the wax pick and wet rub test results.

TABLE 1.—COATING FORMULATION
[Binder constituents]

| Casein | | | Formaldehyde, Wt., gms. | | Modified Reaction Product | | | Latex | | |
|---|---|---|---|---|---|---|---|---|---|---|
| Wt., Parts | Wt., gms. | | | | Wt., Parts | Wt., gms. | | Wt., Parts | Wt., gms. | |
| | Dry | Sol. | Dry | Sol. | | Dry | Sol. | | Dry | Sol. |
| 10 | 36 | 240 | 1.44 | 3.9 | ---- | ---- | ---- | 6 | 21.6 | 45 |
| 9 | 32.4 | 216 | ---- | ---- | 1 | 3.6 | 24 | 6 | 21.6 | 45 |
| 8 | 28.8 | 192 | ---- | ---- | 2 | 7.2 | 48 | 6 | 21.6 | 45 |
| 7 | 25.2 | 168 | ---- | ---- | 3 | 10.8 | 72 | 6 | 21.6 | 45 |
| 6 | 21.6 | 144 | ---- | ---- | 4 | 14.4 | 96 | 6 | 21.6 | 45 |
| 5 | 18.0 | 120 | ---- | ---- | 5 | 18.0 | 120 | 6 | 21.6 | 45 |
| 4 | 14.4 | 96 | ---- | ---- | 6 | 21.6 | 144 | 6 | 21.6 | 45 |
| 3 | 10.8 | 72 | ---- | ---- | 7 | 25.2 | 168 | 6 | 21.6 | 45 |
| 2 | 7.2 | 48 | ---- | ---- | 8 | 28.8 | 192 | 6 | 21.6 | 45 |
| 0 | ---- | ---- | ---- | ---- | 10 | 36.0 | 240 | 6 | 21.6 | 45 |

TABLE 1A

| Pigment Slip | | | Viscosity (centipoises at 100 r.p.m. using No. 6 Brookfield Spindle) | Wax Pick No. | Wet Rub Resistance |
|---|---|---|---|---|---|
| Wt., Parts | Wt., gms. | | | | |
| | Dry | Sol. | | | |
| 100 | 360 | 515 | 7,500 | 7 | Excellent. |
| 100 | 360 | 515 | 5,100 | 7 | Do. |
| 100 | 360 | 515 | 6,400 | 7 | Do. |
| 100 | 360 | 515 | 6,200 | 6 | Do. |
| 100 | 360 | 515 | 5,800 | 6 | Do. |
| 100 | 360 | 515 | 4,600 | 5 | Very good. |
| 100 | 360 | 515 | 2,800 | 5 | Do. |
| 100 | 360 | 515 | 2,300 | 5 | Good. |
| 100 | 360 | 515 | 1,200 | 5 | Fair. |
| 100 | 360 | 515 | 840 | 5 | Do. |

It can be seen from the above table that a coating composition wherein the binder contains about 0–90 weight percent protein and about 10–100 weight percent of a modified dialdehyde polysaccharide-modified polysaccharide reaction product, said weight percents being based on total combined weight of the protein and the reaction product, can have desirable paper coating characteristics. This composition eliminates the undesirable formaldehyde insolubilizing agent and enables the protein to be all or at least partially replaced. It can also be seen that the preferred binder contains about 60–90 weight percent protein and about 10–40 weight percent of the reaction product based on total weight of protein and reaction product. The overall preferred binder contains about 37–57 weight percent protein, about 6–25 weight percent reaction product and about 37.5 weight percent latex.

EXAMPLE 2

Dry blends of 80 parts by weight hydroxyethylated corn starch (Clineo 718D), hypochlorite oxidized corn starch (Douglas Clearsol Gum, Grade W) or enzyme converted corn starch, prepared by treating gelatinized corn starch with alpha amylase until the viscosity was reduced to a value below about 300 centipoises and then dried, and 20 parts by weight of anionic dialdehyde corn starch being about 90 percent oxidized or the cationic reaction product of 70 parts by weight dialdehyde corn starch being about 90 percent oxidized and 30 parts by weight of the condensation product of dicyandiamide and formaldehyde prepared by the preferred procedure were added to water to form slurries having 15 weight percent solids. These slurries were heated with stirring to 188–192° F. (87–89° C.) for 15 minutes to form reaction products to be subsequently used as binders in coating compositions. The reaction product binders were then mixed with an aqueous slip of Georgia kaolin clay (Premier SD), containing 70 weight percent solids to form coating compositions containing about 18 weight percent binder and about 82 weight percent slip. The pH of the coating compositions were then adjusted to values within the range of 5.5–9.0. These various coating compositions were then applied by means of a Meyer draw down rod to coating paper base stock in the manner described in Example 1. The resulting coated papers were then evaluated for wet rub resistance, and optical properties of gloss, brightness and opacity. The wet rub resistance test was conducted by pressing a paper sample under a load of 1040 grams against the wet surface of a 3-in. dia. hard rubber wheel rotating at 550 r.p.m. and having its surface continuously wetted with water. The paper weight loss in milligrams after 11 seconds of abrasion is an expression of the wet rub resistance. The gloss properties were measured according to TAPPI Standard T 480 m–51. This measurement is based on the specular (mirror) reflectance of paper at an incident angle of 75°. Gloss is expressed in arbitrary units based on a perfect reflecting mirror having a gloss value of 383. Brightness was measured according to TAPPI Standard T 452 m–58. Brightness is expressed as a percentage of reflectance compared to a magnesium oxide standard having a value of 100. Opacity was measured according to TAPPI Standard T 425 m–60. The opacity is determined by measuring the diffuse reflectance from a paper specimen having a black backing and the diffuse reflectance from the same paper specimen having a white backing. The opacity is expressed in percent and is equal to 100 times the ratio between the above two reflectance values. An opacity of 100 percent indicates a perfectly opaque paper while an opacity of only a few percent indicates a perfectly transparent sheet. The optical measurements were made using a "photovolt" Photoelectric Reflection Meter Model 610.

The following table shows the coating binder formulations and coating characteristics. In the column designated as "DAS type," the expression "anionic" refers to dialdehyde starch alone, while the expression "cationic" refers to a reaction product of 70 parts by weight dialdehyde starch and 30 parts by weight of a condensation product of dicyandiamide and formaldehyde. In the column designated as "Starch type," the expression "HES" refers to hydroxyethylated starch, the expression "HOS" refers to hypochlorite oxidized starch, and the expression "enzyme" refers to enzyme converted starch.

TABLE 2

| Binder Formulation | | | Wet Rub Weight Loss in mg. 11 sec. | Coating Weight, lb./3,000 sq. ft. | Optical Properties | | |
|---|---|---|---|---|---|---|---|
| DAS Type | Starch Type | pH | | | Gloss | Brightness | Opacity |
| Anionic | HES | 5.5 | 3.0 | 19.2 | 23.0 | 77.5 | 90.5 |
| Cationic | HES | 5.5 | 0.0 | 18.7 | 27.0 | 79.0 | 90.5 |
| Anionic | HES | 7.5 | 6.0 | 13.1 | 21.5 | 77.5 | 89.5 |
| Cationic | HES | 7.5 | 0.0 | 13.4 | 26.5 | 79.0 | 89.5 |
| Anionic | HES | 9.0 | 7.6 | 18.1 | 22.0 | 77.5 | 88.5 |
| Cationic | HES | 9.0 | 0.3 | 18.3 | 32.0 | 79.0 | 89.5 |
| Anionic | HOS | 5.5 | 1.0 | 33.4 | 17.0 | 75.0 | 92.0 |
| Cationic | HOS | 5.5 | 0.0 | 27.2 | 19.0 | 76.0 | 91.3 |
| Anionic | HOS | 7.5 | 1.3 | 18.3 | 28.0 | 73.5 | 90.5 |
| Cationic | HOS | 7.5 | 0.1 | 24.6 | 30.0 | 75.5 | 91.0 |
| Anionic | HOS | 9.0 | 0.6 | 13.9 | 11.0 | 71.0 | 90.0 |
| Cationic | HOS | 9.0 | 0.4 | 21.5 | 44.0 | 75.5 | 91.0 |
| Anionic | Enzyme | 9.0 | 1.3 | 15.4 | 23.0 | 77.0 | 89.8 |
| Cationic | do | 9.0 | 0.8 | 15.9 | 26.5 | 79.0 | 91.5 |

It can be seen from the above table that coating binders of the present invention from cationic modified dialdehyde polysaccharides have improved wet rub resistance as compared to coating binders employing anionic dialdehyde polysaccharides. The optical properties of gloss and brightness are also improved. The opacity attained is satisfactory for coated papers intended for use in offset printing. It can also be seen that coating binders containing no protein can be advantageously used to provide desired coating characteristics.

EXAMPLE 3

A mixture of 100 grams of Georgia kaolin clay (Hydrasperse brand) and 15 grams of hypochlorite oxidized corn starch (Douglas Clearsol Gum, Grade W) was added to 100 grams of tap water. The resulting slurry was heated to 92–93° C. and held for 15 minutes to form a dispersion. The pH was 4.5. A reaction product of 85 weight percent dialdehyde corn starch being about 90 percent oxidized and 15 weight percent of a condensation product of dicyandiamide and formaldehyde prepared by the preferred method was added to a portion of the above dispersion in an amount of 5 weight percent based on the weight of the hypochlorite oxidized starch in said portion of dispersion. The pH was then adjusted to 5.5 by adding sodium hydroxide. A product of reaction between about 4.8 weight percent of the dialdehyde starch-dicyandiamide-formaldehyde component and about 95.2 weight percent hypochlorite oxidized starch was thus prepared. This reaction product forms the binder in the clay coating composition designated as composition A. To another portion of the above dispersion of clay and hypochlorite oxidized starch was added a reaction product of 85 weight percent dialdehyde starch and 15 weight percent dicyandiamide-formaldehyde condensation product in an amount of 10 weight percent based on the weight of the hypochlorite oxidized starch in said portion of dispersion. The pH was adjusted to 5.5 by adding sodium hydroxide. A product of reaction between about 9 weight percent of the dialdehyde starch-dicyandiamide-formaldehyde component and about 91 weight percent hypochlorite oxidized starch was thus prepared. This reaction product forms the binder in the clay coating composition designated as composition B.

Coating Composition A was added by means of a Meyer draw down rod to cellulosic paper stock in an amount of 6.8 lbs. per 3000 sq. ft. Coating composition B was added to separate sheets of paper in an amount of 8.2 lbs. per 3000 sq. ft. The coated sheets were then air dried for about 15 minutes at room temperature (20–30° C.) and then cured for 3 minutes at 220° F. (104° C.). The wet rub resistance of the coated sheets was measured in accordance with the method described in Example 2. Various contact times were used. The test results are shown in the following table.

TABLE 3

| Coating Composition: | Abrasion Time, Sec. | Weight Loss, mg. |
| --- | --- | --- |
| A | 10 | 5 |
| B | 10 | 0 |
| A | 30 | 23 |
| B | 30 | Trace |
| A | 60 | 40 |
| B | 60 | 4 |

It can be seen from the above table that the protein-free binder consisting of the reaction product of 9 weight percent of the modified dialdehyde polysaccharide-modified polysaccharide reaction product and 91 weight percent hypochlorite oxidized polysaccharide has substantial utility in coating compositions wherein good wet rub resistance is required.

The above examples all use modified dialdehyde polysaccharides consisting of products of reaction between 70–85 weight percent dialdehyde starch and 15–30 weight percent dicyandiamide-formaldehyde condensation product. It should also be understood that other dialdehyde polysaccharides can be used as well as the products of reaction between 70–85 weight percent dialdehyde starch, 7.5–15 weight percent carboxylated starch and 7.5–15 weight percent dicyandiamide-formaldehyde condensation product to form novel binders of the present invention.

In summary, the present invention relates to novel binders for use in coating compositions for paper. These novel binders contain 0–90 weight percent protein and 10–100 weight percent of a modified dialdehyde polysaccharide-modified polysaccharide reaction product, said weight percents being based on total combined weight of protein and reaction product. The invention also includes coating compositions containing the novel binder. This novel binder does not utilize undesirable insolubilizing agents and it permits the use therein of either a substantially reduced amount or no protein. When a reduced amount of protein is used, this novel binder has the unobvious characteristic of providing a compatible starch-protein binder composition.

What is claimed is:

1. A binder for paper coating compositions, said binder comprising (A) about 0–90 weight percent protein and (B) about 10–100 weight percent of a modified dialdehyde polysaccharide-modified polysaccharide reaction product wherein said dialdehyde polysaccharide contains .5 to about 100 mole percent dialdehyde polysaccharide units, said weight percents being based on the total combined weight of protein (A) and reaction product (B), said reaction product (B) consisting of the product of reaction of about 9–20 weight percent of a modified dialdehyde polysaccharide and about 80–91 weight percent of a modified polysaccharide, said weight percents being based on total weight of reaction product (B), wherein said modified dialdehyde polysaccharide is selected from the class consisting of (1) the reaction product of about 70–85 parts by weight dialdehyde polysaccharide and about 15–30 parts by weight of a condensation product of dicyandiamide and formaldehyde and (2) the reaction product of about 70–85 parts by weight dialdehyde polysaccharide, about 7.5–15 parts by weight carboxylated polysaccharide and about 7.5–15 parts by weight of a condensation product of dicyandiamide and formaldehyde, and wherein said modified polysaccharide is selected from the class consisting of hydroxyethylated polysaccharides with about 1 to about 10 out of 100 anhydroglucose units in the polysaccharide hydroxyethylated, carboxylated polysaccharides with about 1 to about 10 out of 100 anhydro glucose units in the polysaccharide carboxylated and acetylated polysaccharides with about 1 to about 10 out of 100 anhydro glucose units in the polysaccharide acetylated.

2. A binder for paper coating compositions according to claim 1 wherein reaction product (B) consists of the product of reaction of about 9–20 weight percent of the reaction product of about 70–85 parts by weight dialdehyde polysaccharide and about 15–30 parts by weight of a condensation product of dicyandiamide and formaldehyde and about 80–91 weight percent of a modified polysaccharide selected from the class consisting of hydroxyethylated polysaccharides, carboxylated polysaccharides, and acetylated polysaccharides.

3. A binder for paper coating compositions according to claim 1 wherein reaction product (B) consists of the product of reaction of about 9–20 weight percent of the reaction product of about 70–85 parts by weight dialdehyde polysaccharide and about 15–30 parts by weight of a condensation product of dicyandiamide and formaldehyde and about 80–91 weight percent hydroxyethylated polysaccharides.

4. A binder for paper coating compositions according to claim 1 wherein reaction product (B) consists of the product of reaction of about 9–20 weight percent of the reaction product of about 70 parts by weight dialdehyde polysaccharide and about 30 parts by weight of a condensation product of dicyandiamide and formaldehyde and about 80–91 weight percent hydroxyethylated polysaccharides.

5. A binder for paper coating compositions according to claim 1 wherein reaction product (B) consists of the product of reaction of about 20 weight percent of the reaction product of about 70 parts by weight dialdehyde polysaccharide and about 30 parts by weight of a condensation product of dicyandiamide and formaldehyde and about 80 weight percent hydroxyethylated polysaccharides.

6. A binder for paper coating compositions according to claim 5 wherein the dialdehyde polysaccharide is dialdehyde starch and the hydroxyethylated polysaccharide is hydroxyethylated starch.

7. A binder for paper coating compositions according to claim 1 wherein said binder also contains a butadiene-styrene latex.

8. A binder for paper coating compositions according to claim 7 wherein the butadiene-styrene latex is present in an amount of about 10 to about 50 weight percent based on total weight of the binder.

9. A binder for paper coating compositions according to claim 1 wherein the binder comprises (A) about 60–90 weight percent protein and (B) about 10–40 weight percent of the modified dialdehyde polysaccharide-modified polysaccharide reaction product, said weight percents being based on the total combined weight of protein (A) and reaction product (B).

10. A binder for paper coating compositions according to claim 1 wherein the binder consists of about 37–57 weight percent protein (A), about 6–25 weight percent of reaction product (B) and about 37.5 weight percent butadiene-styrene latex.

11. A paper coating composition consisting of an aqueous suspension of about 100 parts by weight clay, about 6 parts by weight of a butadiene-styrene latex, about 6–9 parts by weight protein and about 1–4 parts by weight of a reaction product consisting of about 20 weight percent of the reaction product of about 70 parts by weight dialdehyde starch containing .5 to about 100 mole percent dialdehyde polysaccharide units and about 30 parts by weight of a condensation product of dicyandiamide and formaldehyde and about 80 weight percent hydroxyethylated starch with about 1 to about 10 out of 100 anhydro glucose units in the polysaccharide hydroxyethylated.

References Cited
UNITED STATES PATENTS 3,236,792    2/1966    Curtis _____ 260—17.3
3,269,964    8/1966    Curtis _____ 260—17.3

WILLIAM H. SHORT, *Primary Examiner.*

E. M. WOODBERRY, *Assistant Examiner.*